United States Patent [19]

Fukuro

[11] Patent Number: 5,598,211
[45] Date of Patent: Jan. 28, 1997

[54] TELEVISION CAMERA APPARATUS WITH DEVICE FOR PREVENTING CONDENSATION OF WATER VAPOR ON SURFACE OF IMAGE PICK-UP ELEMENT

[75] Inventor: Toshihiro Fukuro, Kodaira, Japan

[73] Assignee: Hitachi Denshi Kabushiki Kaisha, Tokyo, Japan

[21] Appl. No.: 432,863

[22] Filed: May 2, 1995

Related U.S. Application Data

[63] Continuation of Ser. No. 129,339, Sep. 30, 1993, abandoned.

[30] Foreign Application Priority Data

Oct. 7, 1992 [JP] Japan .................................. 4-293699

[51] Int. Cl.$^6$ .................................................. H04N 5/225
[52] U.S. Cl. ....................... 348/374; 348/207; 348/244
[58] Field of Search ................................... 348/207, 243, 348/244, 373, 374, 375, 748

[56] References Cited

U.S. PATENT DOCUMENTS

| | | | |
|---|---|---|---|
| 3,306,975 | 2/1967 | Donnay | 348/244 |
| 4,551,760 | 5/1985 | Bendell | 348/244 |
| 4,567,080 | 1/1986 | Korsgaard | 428/137 |
| 4,580,168 | 4/1986 | Levine | 348/244 |
| 4,588,270 | 5/1986 | Tamaki | 351/212 |
| 4,591,901 | 5/1986 | Andrevski | 358/50 |
| 4,739,409 | 4/1988 | Baumeister | 348/244 |
| 5,155,358 | 10/1992 | Larson | 348/244 |

FOREIGN PATENT DOCUMENTS

| | | | |
|---|---|---|---|
| 5007319 | 1/1993 | Japan | H04N 5/225 |
| 5316407 | 11/1993 | Japan | H01L 23/38 |
| 2146866 | 4/1985 | United Kingdom | H04N 5/225 |

OTHER PUBLICATIONS

Peltier–Kuhler Zur Empfindlichkeitsverbesserung von Halbleiter–Bildsensoren, in: Fernseh—Und Kino-Technik, 1984, No. 3, p. 122.

Primary Examiner—Leo Boudreau
Assistant Examiner—Bipin Shalwala
Attorney, Agent, or Firm—Antonelli, Terry, Stout & Kraus, LLP

[57] ABSTRACT

A television camera apparatus having at least one image-pickup element with a light incidence portion and supported by an image-pickup element holder, a housing connected with the image-pickup element holder and enabling light to pass through a portion thereof for incidence on the light incidence portion of the image-pickup element, and a temperature controlling cooling section provided in a predetermined portion of the housing. The temperature controlling cooling section includes a cooling-side surface portion which is controlled to have a temperature lower than a temperature of the light incidence portion of the image-pickup element during operation of the television camera apparatus, so that free water contained in air inside of the housing is condensed on the cooling-side surface portion. The apparatus also enables discharge of the condensed water outside of the housing.

20 Claims, 2 Drawing Sheets

TELEVISION CAMERA APPARATUS WITH DEVICE FOR PREVENTING CONDENSATION OF WATER VAPOR ON SURFACE OF IMAGE PICK-UP ELEMENT

This application is a Continuation application of Ser. No. 08/129,339, filed Sep. 30, 1993 now abandoned.

BACKGROUND OF THE INVENTION

1. Field of the Invention

The present invention relates to prevention of water vapor condensation in a television camera apparatus.

2. Description of Related Art

In order to maintain favorable performance of image-pickup elements such as image-pickup tubes and solid-state image-pickup elements and to lengthen their lives, temperature control has conventionally been performed so that temperatures of the target surfaces of the image-pickup elements are kept substantially constant.

However, when image-pickup elements are cooled in a high-temperature and high-humidity atmosphere, water vapor is condensed into water on the surfaces of the image-pickup elements in some cases. If image shooting is performed with a television camera in such a state, there arises a problem that blurred images will be produced. Therefore, conventionally, in order to prevent water vapor condensation on the surfaces of image-pickup elements, the humidity in the environment in which the television camera is used is limited, temperature-decreases of the surfaces of the image-pickup elements are limited, or sealing tightness in the optical system (prism) housing to which the image-pickup elements are attached is improved. Moreover, the inside air is dried by a dehumidifying agent or the like. Thus, water vapor condensation due to cooling of the surfaces of the image-pickup elements has been prevented.

Conventionally, the environment in which the apparatus is used is restricted to prevent water vapor condensation on the surfaces of the image-pickup elements, and consequently, the mobility of the apparatus is deteriorated in some cases. In the case of a structure in which an increase in humidity is suppressed by increasing sealing tightness of the prism housing, it is necessary to raise the accuracy in machining of component parts, thus increasing the manufacturing cost of the component parts. Further, the maintenance of the apparatus is difficult, and the apparatus is not fit for long-term repeated use.

SUMMARY OF THE INVENTION

It is an object of the present invention to provide a television camera apparatus which solves the above-described problems and prevents water vapor condensation on the surfaces of image-pickup elements, to thereby obtain favorably shot images constantly.

In order to achieve this object, according to the invention, a television camera apparatus has a structure including a temperature controlling cooling section which is provided in a predetermined portion of the television camera apparatus (e.g., in a prism housing to which image-pickup elements are attached), the temperature controlling cooling section including a cooling portion which is controlled to have a temperature lower than surface temperatures of the image-pickup elements during operation of the television camera apparatus, and a water discharge mechanism for discharging water which is condensed on the cooling portion of the temperature controlling cooling section.

The function of the invention will now be described. During operation of the television camera apparatus, the cooling portion of the temperature controlling cooling section provided inside of the television camera apparatus is controlled in such a manner that a temperature of the cooling portion of the temperature controlling cooling section is lower than surface temperatures of the image-pickup elements, and that temperatures of the image-pickup elements are lower than the temperature in the environment. Owing to the correlation between humidity and temperature, as obviously understood from the well known steam diagram (not shown), when the temperature of the cooling portion of the temperature controlling cooling section and the temperature in the environment have a predetermined temperature difference or more (for example, about 2.4 degrees when the temperature in the environment is 40° C. and the humidity is 90% RH), the inside of the television camera apparatus will be in a water vapor saturated state, so that water vapor contained in the television camera apparatus is condensed into drops of water. Since the temperature of the cooling portion of the temperature controlling cooling section is lower than the surface temperatures of the image-pickup elements, the water drops will be attached to the cooling portion of the temperature controlling cooling section. As a result, the humidity inside of the television camera apparatus is decreased so that water vapor condensation on the surfaces of the image-pickup elements can be prevented even if the surfaces of the image-pickup elements are cooled down to temperatures lower than the temperature in the environment.

Further, the water attached to the cooling portion of the temperature controlling cooling section is absorbed by the water discharge mechanism (e.g., a water-absorbing and discharging device made of Japanese paper, non-woven fabric, or cloth), led to a portion of the apparatus where the water will not be attached to the surfaces of the image-pickup elements again (e.g., the outside of the prism housing), and released into the atmosphere. Thus, water can be prevented from accumulating in the vicinity of the image-pickup elements, to thereby eliminate unfavorable influences such as reattachment of water to the image-pickup elements or other component parts.

Moreover, the water released into the atmosphere is naturally dried by circulation and heat of the atmospheric air. Therefore, the environment in which the television camera apparatus is used is not restricted, and the dehumidification mechanism in the television camera apparatus can function constantly.

DETAILED DESCRIPTION OF THE PREFERRED EMBODIMENTS

The structure and operation of one embodiment of a television camera apparatus according to the present invention will be hereinafter described.

Figure 1:
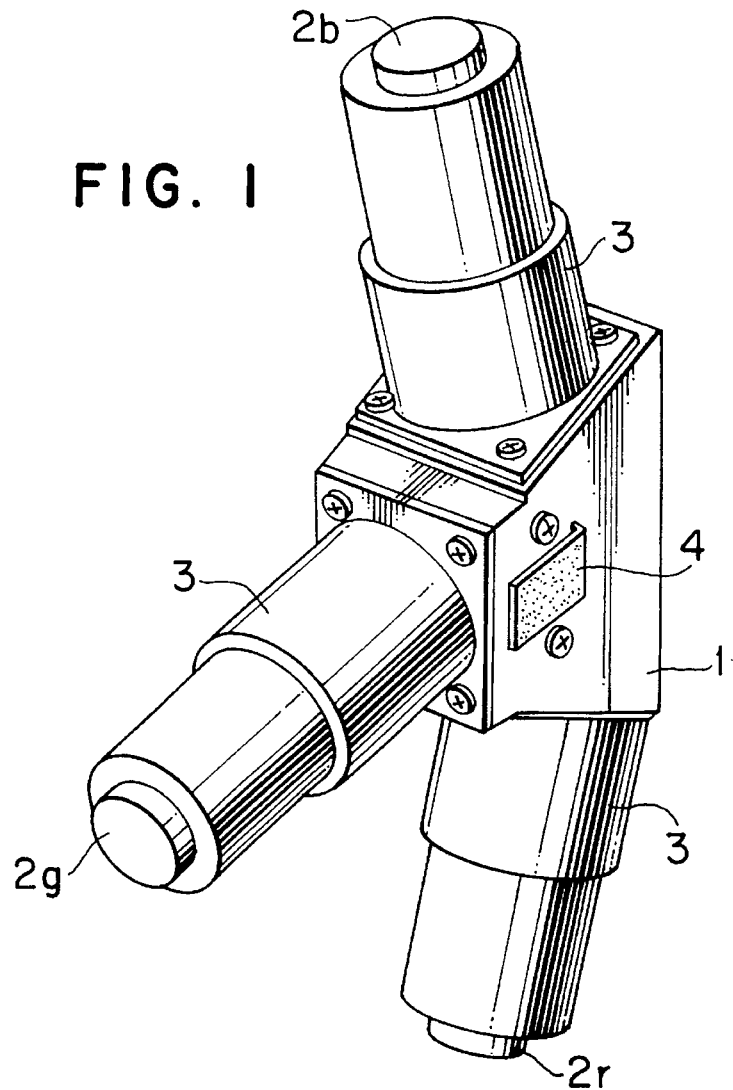
FIG. 1 is a perspective view showing one embodiment of a television camera apparatus according to the present invention.
Figure 2:
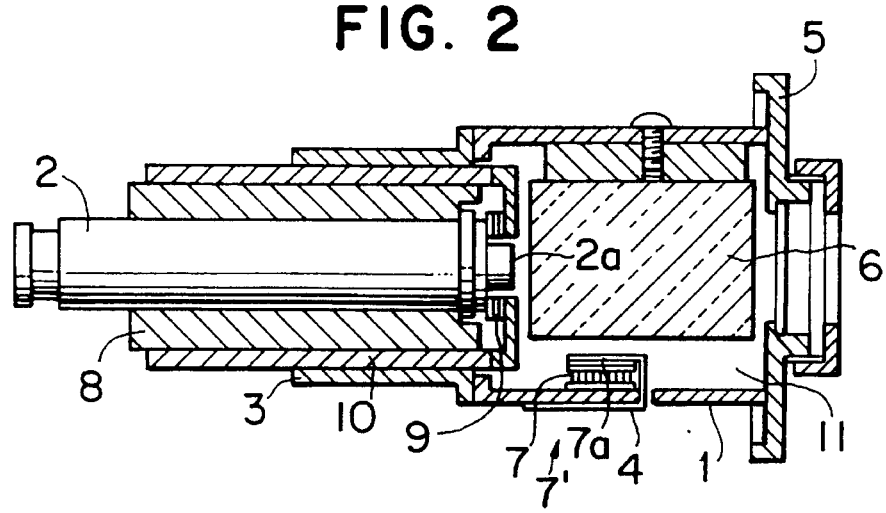
FIG. 2 is a cross-sectional view showing an essential portion of the embodiment according to the invention.

FIG. 1 is a perspective view showing locations of a whole prism optical system, a temperature controlling cooling section, and a water discharge mechanism when the present invention is applied to a prism housing of a television camera of a three-tube type, and FIG. 2 is a cross-sectional view showing an essential portion of the same.

A prism 6 for separating light into three spectral components is provided inside of a prism housing 1, and three camera tubes for converting the separated spectral components into electric signals, i.e., a red-signal camera tube 2r, a green-signal camera tube 2g, and a blue-signal camera tube 2b, are fixed on the prism housing 1 through holders 3. A temperature control element for controlling a surface temperature of the camera tube, e.g., a Peltier cooling element 9 (hereinafter referred to as a camera-tube cooling Peltier element 9), is attached to each of the camera tubes 2r, 2g, and 2b so as to control the camera tube surface 2a to have a predetermined temperature (e.g., 35° C. or less).

Cooling of each of the camera tubes 2r, 2g, and 2b involves a problem that when the surface temperature of a light incidence portion of the camera tube (the camera tube surface 2a) is lower than the temperature in the environment, free water is more apt to attach to the camera tube surface 2a as the humidity increases, thereby blurring a shot image.

In order to prevent this inconvenience, according to the present invention, the prism housing 1 includes a temperature controlling cooling section 7' including for example, a Peltier cooling element 7, which is controlled to have a temperature constantly lower than the surface temperatures of the camera tubes, so that free water which is about to form dew on the camera tube surfaces will be forcibly condensed on a cooling portion of the temperature controlling cooling section 7'. (The cooling portion of the temperature controlling cooling section 7' is part of the Peltier cooling element 7 which will be hereinafter referred to as the forcible-condensation Peltier element 7).

Further, water which is condensed on the forcible-condensation Peltier element 7 is absorbed by a water-absorbing and discharging sheet 4 serving as a water-absorbing and discharging device which constitutes the water discharge mechanism, and released into the atmosphere outside of the prism housing 1. As a result, the humidity in the prism housing 1 can be decreased.

Next, the structure of this invention will be described more specifically. The prism 6, the camera tube holders 3, the forcible-condensation Peltier element 7, and the water-absorbing and discharging sheet 4 are provided on the prism housing 1 which is attached to a camera casing 5. A deflection yoke 8, a camera tube 2, a camera-tube cooling Peltier element 9, and a radiator 10 for radiating heat generated by the Peltier element 9 are provided on each of the camera tube holders 3.

The forcible-condensation Peltier element 7 is cooled so that the temperature of the cooling portion of the forcible-condensation Peltier element 7 will be the lowest in the prism housing 1. When the temperature of the cooling portion of the forcible-condensation Peltier element 7 and the temperature in the environment have a predetermined difference or more (for example, about 2.4 degrees when the temperature in the environment is 40° C. and the humidity is 90% RH), as described above, the inside of the prism housing 1 will be in a water vapor saturated state, so that free water contained in the air 11 inside of the prism housing 1 is condensed on the cooling-side surface 7a of the forcible-condensation Peltier element 7. Then, the condensed water is absorbed by the water-absorbing and discharging sheet 4 made of paper, cloth, or non-woven fabric and released into the atmosphere outside of the prism housing 1 via the water-absorbing and discharging sheet 4. Thus, water contained in the air 11 inside of the prism housing 1 is removed to prevent water vapor condensation on the camera tube surfaces 2a.

Figure 3:
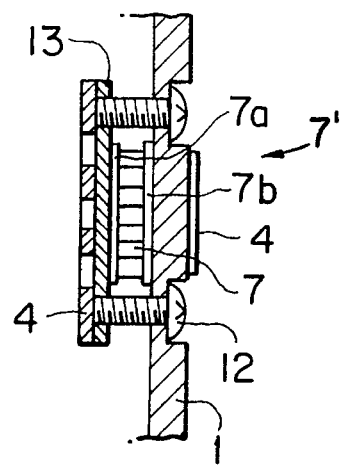
FIG. 3 is a cross-sectional view showing one embodiment of a dehumidification mechanism according to the invention.

FIG. 3 is a diagram specifically showing one embodiment of the dehumidification mechanism with the forcible-condensation Peltier element 7, the water-absorbing and discharging sheet 4, and so forth. The forcible-condensation Peltier element 7 is attached to the prism housing 1 by means of screws fasteners 12 and a cooling plate 13. In FIG. 3, reference numeral 7a denotes the cooling-side surface of the forcible-condensation Peltier element 7, and 7b denotes the heat generating-side surface of the same. The water-absorbing and discharging sheet 4 extending toward the outside of the prism housing 1 is adhered to the cooling plate 13. The water-absorbing and discharging sheet 4 absorbs drops of water which are condensed on the cooling plate 13, and further leads the absorbed water out of the prism housing 1 via capillary action to let it be evaporated. Thus, the dehumidification mechanism functions repeatedly and continuously.

Figure 4:
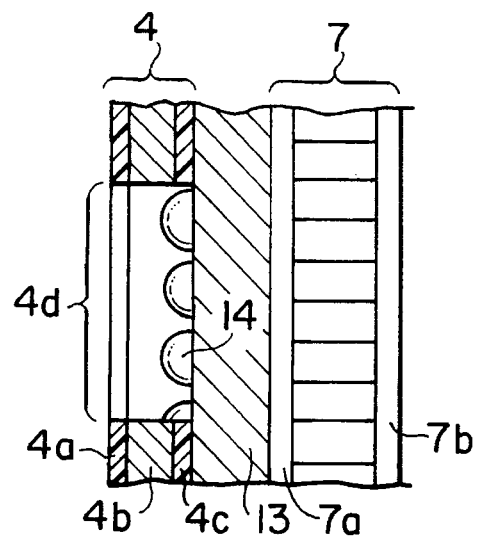
FIG. 4 is an enlarged view partially showing one embodiment of a water-absorbing and discharging device according to the invention.

FIG. 4 is an enlarged view partially showing the water-absorbing and discharging sheet 4. The cooling plate 13 is closely fixed on the cooling-side surface 7a of the forcible-condensation Peltier element 7. Water vapor condensation holes 4d having a predetermined size are formed in that portion of the water-absorbing and discharging sheet 4 which is adhered to the cooling plate 13. When the cooling plate 13 is cooled to produce a water vapor saturated state, drops of water 14 are attached to the cooling plate 13. The attached water drops 14 become larger as time elapses, so that when the water drops have attained certain dimensions, they will be absorbed by water-absorptive paper 4b of the water-absorbing and discharging sheet 4. The water absorbed by the water-absorptive paper 4b is diffused over the entire water-absorptive paper 4b, and consequently led to the outer surface of the prism housing 1 (not shown) where it is evaporated.

Moreover, as reinforcing materials, thin films 4a, 4c made of plastic material or the like are adhered to both surfaces of the water-absorptive paper 4b (by ultrasonic welding, in this case), thereby preventing water evaporation within the prism housing 1 (not shown).

Figure 5:
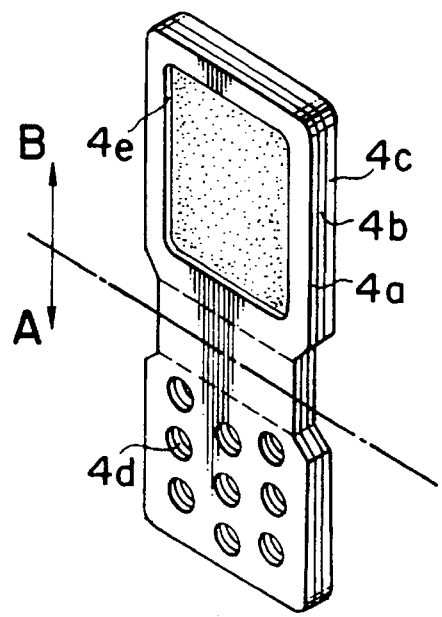
FIG. 5 is a general view showing a water-absorbing and discharging device according to the invention.

FIG. 5 is a perspective view showing a general structure of one embodiment of the water-absorbing and discharging sheet 4 according to the present invention. In actual use, as shown in FIG. 2, the water-absorbing and discharging sheet 4 is folded at an appropriate position, e.g., at the broken shown in FIG. 5, in accordance with a structure of an attachment portion.

The portion of the water-absorbing and discharging sheet 4 which is indicated by the arrow A is located at a position inside of the prism housing 1 (not shown), and the rest of the water-absorbing and discharging sheet 4 which is indicated by the arrow B is located at a position outside of the prism housing 1, so that water is evaporated through a large hole 4e formed in the plastic film 4a.

In the above-described embodiment, the present invention is applied to dehumidification of the inside of the prism housing of the television camera of the three-tube type. However, the invention is not restricted to this embodiment. Needless to say, the invention can be likewise applied to a television camera without a prism housing, a television camera with solid-state image-pickup elements, or the like by providing a temperature controlling cooling section or the like at a predetermined position in the vicinity of the image-pickup elements, the temperature controlling cooling section being controlled to have a temperatures lower than the surface temperature of the image-pickup elements.

In this embodiment, Peltier elements are used as cooling and water vapor condensation/dehumidification means. However, the present invention is not restricted to these Peltier elements. Any cooling means for temperature control which produce similar effects, such as electronic cooling elements, may of course be used in this invention.

Furthermore, in this embodiment, a water-absorbing and discharging sheet made of paper, cloth, or the like is employed as the water discharge mechanism. However, the invention is not restricted to the structure and material described above. Any existing water discharge mechanism which produces similar effects may of course be used in this invention.

According to the present invention, the following effects can be produced.

1. Even if the surface temperatures of the image-pickup elements are made lower than the temperature in the environment, water vapor condensation on the surfaces of the image-pickup elements can be prevented.

2. The dehumidification mechanism in combination with the cooling means for temperature control such as electronic cooling elements or the like enables long-term repeated dehumidification, and is different from the conventional dehumidifying agent in this respect.

3. The dehumidification mechanism, which is small in size and light in weight, can be installed even in a limited space.

5. The dehumidification mechanism, which has a simple structure, can be produced at low costs.

What is claimed is:

1. A television camera apparatus comprising:
   at least one image-pickup element having a light incidence portion and being supported by an image-pickup element holder;
   a first cooling means for cooling said at least one image-pickup element;
   a housing connected with said image-pickup element holder, and enabling light to pass through at least a portion thereof for incidence on said light incidence portion of said image-pickup element; and
   a temperature controlling cooling section provided in a predetermined portion of said housing, said temperature controlling cooling section having a cooling-side surface portion and a second cooling means for cooling said cooling-side surface portion to have a temperature lower than a temperature of said light incidence portion of said image-pickup element as cooled by said first cooling means during operation of the television camera apparatus so that free water contained in air inside of said housing is condensed on said cooling-side surface portion.

2. A television camera apparatus according to claim 1, wherein said first cooling means is disposed proximate to said light incidence portion of said image-pickup element.

3. A television camera apparatus according to claim 1, wherein said second cooling means is a Peltier element.

4. A television camera apparatus according to claim 2, further comprising a water discharge means connected with said temperature controlling cooling section for discharging water condensed on said cooling-side surface portion of said temperature controlling cooling section from the inside of said housing to the outside thereof.

5. A television camera apparatus according to claim 4, wherein said second cooling means is a Peltier element.

6. A television camera apparatus according to claim 5, wherein said water discharge means is a water-absorbing and discharging sheet extending toward the outside of said housing.

7. A television camera apparatus according to claim 6, wherein a predetermined portion of said water-absorbing and discharging sheet is protectively coated by a plastic material to prevent vaporization of said water within said housing.

8. A television camera apparatus according to claim 2, wherein said housing has a prism for separating said light into three spectral components.

9. A television camera apparatus according to claim 4, wherein said housing has a prism for separating said light into three spectral components.

10. A television camera apparatus according to claim 1, wherein said temperature controlling cooling section has a heat generating-side surface portion coupled to an inside surface of said housing to enable heat to flow from said heat generating-side surface portion through said housing to an outside surface of said housing.

11. A television camera apparatus comprising:
    a housing having a light-transmitting portion, the housing containing an atmosphere susceptible to contamination by water vapor;
    at least one image-pickup element, each image-pickup element of the at least one image-pickup element having a light-receiving surface and being coupled to the housing such that the light-receiving surface is disposed inside the housing to enable the light-receiving surface to receive light passing through the light-transmitting portion of the housing;
    first cooling means for cooling the at least one image-pickup element such that the light-receiving surface of each image-pickup element of the at least one image-pickup element has a first temperature; and
    second cooling means having a cooling portion, at least the cooling portion of the second cooling means being disposed inside the housing, the second cooling means cooling the cooling portion to have a second temperature sufficiently lower than the first temperature to which the light-receiving surface of each image-pickup element of the at least one image-pickup element is cooled by the first cooling means to cause water vapor in the atmosphere in the housing to condense into water on the cooling portion of the second cooling means rather than on the light-receiving surface of each image-pickup element of the at least one image-pickup element.

12. A television camera apparatus according to claim 11, wherein the first cooling means is disposed proximate to the light-receiving surface of each image-pickup element of the at least one image-pickup element.

13. A television camera apparatus according to claim 12, further comprising water discharging means coupled to the cooling portion of the second cooling means for discharging the water on the cooling portion of the second cooling means outside the housing.

14. A television camera apparatus according to claim 13, wherein the second cooling means includes a Peltier element having a cooling-side surface, the cooling-side surface of the Peltier element being coupled to the cooling portion of the second cooling means.

15. A television camera apparatus according to claim 14, wherein the water discharging means includes a water-absorbing and discharging sheet extending from inside the housing to outside the housing for absorbing the water on the cooling portion of the second cooling means and discharging the absorbed water outside the housing.

16. A television camera apparatus according to claim 15, wherein the water discharging means further includes a coating impervious to water disposed on a predetermined portion of the water-absorbing and discharging sheet inside the housing to prevent the water absorbed by the water-absorbing and discharging sheet from evaporating from the predetermined portion of the water-absorbing and discharging sheet inside the housing.

17. A television camera apparatus according to claim 13, further comprising a prism disposed inside the housing for separating the light passing through the light-transmitting portion of the housing into light of three spectral components;

wherein the at least one image-pickup element is three image-pickup elements having respective light-receiving surfaces and being coupled to the housing such that the light-receiving surfaces are disposed inside the housing to enable the light-receiving surfaces to receive light of respective ones of the three spectral components from the prism.

18. A television camera apparatus according to claim 12, further comprising a prism disposed inside the housing for separating the light passing through the light-transmitting portion of the housing into light of three spectral components;

wherein the at least one image-pickup element is three image-pickup elements having respective light-receiving surfaces and being coupled to the housing such that the light-receiving surfaces are disposed inside the housing to enable the light-receiving surfaces to receive light of respective ones of the three spectral components from the prism.

19. A television camera apparatus according to claim 11, wherein the second cooling means includes a Peltier element having a cooling-side surface, the cooling-side surface of the Peltier element being coupled to the cooling portion of the second cooling means.

20. A television camera apparatus according to claim 11, wherein the second cooling means has a heating portion, the second cooling means cooling the cooling portion while heating the heating portion by causing heat to flow from the cooling portion to the heating portion, the heating portion being coupled to an inside surface of the housing to enable heat to flow from the heating portion through the housing to an outside surface of the housing.

* * * * *